United States Patent
Hamada

(10) Patent No.: US 9,451,392 B2
(45) Date of Patent: Sep. 20, 2016

(54) COMMUNICATION DEVICE, CONTROLLING METHOD FOR COMMUNICATION DEVICE, AND STORAGE MEDIUM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/800,360

(22) Filed: Jul. 15, 2015

(65) Prior Publication Data

US 2016/0029150 A1  Jan. 28, 2016

(30) Foreign Application Priority Data

Jul. 23, 2014  (JP) ................................. 2014-149933

(51) Int. Cl.
*H04W 4/00* (2009.01)
*H04W 76/02* (2009.01)
(Continued)

(52) U.S. Cl.
CPC .............. *H04W 4/008* (2013.01); *H04W 12/04* (2013.01); *H04W 12/06* (2013.01); *H04W 36/0016* (2013.01); *H04W 76/023* (2013.01)

(58) Field of Classification Search
CPC ... H04W 4/008; H04W 12/04; H04W 12/06; H04W 36/0016; H04W 76/023; H04W 84/18; H04B 1/71637
USPC ................................. 455/41.1, 41.2; 375/256
See application file for complete search history.

(56) References Cited

U.S. PATENT DOCUMENTS 6,892,052 B2 * 5/2005 Kotola ................... G06Q 20/20
340/10.1
7,471,200 B2 * 12/2008 Otranen ............... G06K 7/0008
340/505

(Continued)

FOREIGN PATENT DOCUMENTS

JP  2009-207069 A  9/2009
JP  2010-279042 A  12/2010

OTHER PUBLICATIONS

Connection Handover Technical Specification NFC Forum Connection Handover 1.2 NFCForum-TS-ConnectionHandover_1_2.doc 2010-07-07.

*Primary Examiner* — Hai V Nguyen
(74) *Attorney, Agent, or Firm* — Canon USA, Inc. IP Division

(57) ABSTRACT

A communication device transmits, using a wireless communication through a first communication scheme, a first request message requesting connection by the second communication scheme to another communication device, which includes information indicating that communication processing to be requested to the another communication device has not been determined, receives, using a wireless communication through the first communication scheme, a first response message including information indicating whether the connection can be established by the second communication unit and information indicating communication processing executable by the another communication device using a wireless communication through the second communication scheme, and selects communication processing to be executed using the wireless communication through the second communication scheme based on the information which is included in the received first response message and information about the communication processing by the another communication device using the wireless communication through the second communication scheme.

14 Claims, 10 Drawing Sheets

(51) Int. Cl.
*H04W 36/00* (2009.01)
*H04W 12/06* (2009.01)
*H04W 12/04* (2009.01)

(56) References Cited

U.S. PATENT DOCUMENTS

| | | | | |
|---|---|---|---|---|
| 7,970,910 B2* | 6/2011 | Choi | H04L 45/00 | 370/328 |
| 7,986,980 B2* | 7/2011 | Nurminen | H04W 52/0258 | 455/140 |
| 8,301,124 B2* | 10/2012 | Soma et al. | H04M 1/7253 | 455/41.2 |
| 8,358,596 B2* | 1/2013 | Byrne et al. | H04W 76/02 | 370/255 |
| 8,781,394 B2* | 7/2014 | Kawashimo | H04B 5/02 | 455/41.1 |
| 9,230,252 B2* | 1/2016 | Naruse | H04N 1/00925 | |
| 9,258,836 B2* | 2/2016 | Fujita | H04W 4/008 | |
| 2003/0092444 A1* | 5/2003 | Sengodan | H04W 12/08 | 455/436 |
| 2007/0141984 A1* | 6/2007 | Kuehnel | H04W 4/00 | 455/41.2 |
| 2009/0077241 A1* | 3/2009 | Choi | H04L 45/00 | 709/227 |
| 2009/0088199 A1* | 4/2009 | Nurminen | H04W 52/0258 | 455/552.1 |
| 2009/0111378 A1* | 4/2009 | Sheynman | H04W 8/005 | 455/41.1 |
| 2010/0081385 A1* | 4/2010 | Lin | H04M 1/7253 | 455/41.3 |
| 2011/0019640 A1* | 1/2011 | Chang | H04W 36/14 | 370/331 |
| 2011/0213876 A1* | 9/2011 | Kumar | H04L 67/16 | 709/224 |
| 2012/0069772 A1* | 3/2012 | Byrne | H04W 76/02 | 370/255 |
| 2012/0238205 A1* | 9/2012 | Reunam ki et al. | H04B 5/02 | 455/41.1 |
| 2012/0265913 A1* | 10/2012 | Suum ki et al. | H04W 4/008 | 710/303 |
| 2012/0290731 A1* | 11/2012 | Suum ki et al. | H04L 61/2007 | 709/228 |
| 2014/0089513 A1* | 3/2014 | Adachi et al. | H04W 76/02 | 709/227 |
| 2014/0187163 A1* | 7/2014 | Fujita | H04W 4/008 | 455/41.2 |
| 2014/0254498 A1* | 9/2014 | Mueck et al. | H04W 72/02 | 370/329 |
| 2014/0285033 A1* | 9/2014 | Jantunen et al. | H04B 5/0031 | 307/149 |
| 2014/0302832 A1* | 10/2014 | Fu et al. | H04W 4/008 | 455/417 |
| 2014/0302849 A1* | 10/2014 | Palin et al. | H04W 8/005 | 455/436 |
| 2014/0342665 A1* | 11/2014 | Amano | H04W 52/0229 | 455/41.1 |
| 2014/0378052 A1* | 12/2014 | Hamada | G06F 1/3225 | 455/41.1 |
| 2015/0004908 A1* | 1/2015 | Lee | H04W 76/023 | 455/41.1 |
| 2015/0031288 A1* | 1/2015 | Tubbesing | H04W 4/008 | 455/41.1 |
| 2015/0036176 A1* | 2/2015 | Naruse | H04N 1/00925 | 358/1.15 |
| 2015/0097974 A1* | 4/2015 | Hamada | H04N 1/00103 | 348/207.2 |
| 2015/0111493 A1* | 4/2015 | Berkema | H04W 8/005 | 455/41.1 |
| 2015/0223281 A1* | 8/2015 | Hamada | H04W 76/023 | 455/41.1 |
| 2015/0245298 A1* | 8/2015 | Takahashi | H04W 52/0254 | 455/574 |
| 2015/0278564 A1* | 10/2015 | Naruse | G06F 3/1292 | 340/10.51 |
| 2015/0296416 A1* | 10/2015 | Lee | H04W 8/005 | 370/331 |

* cited by examiner

FIG.1
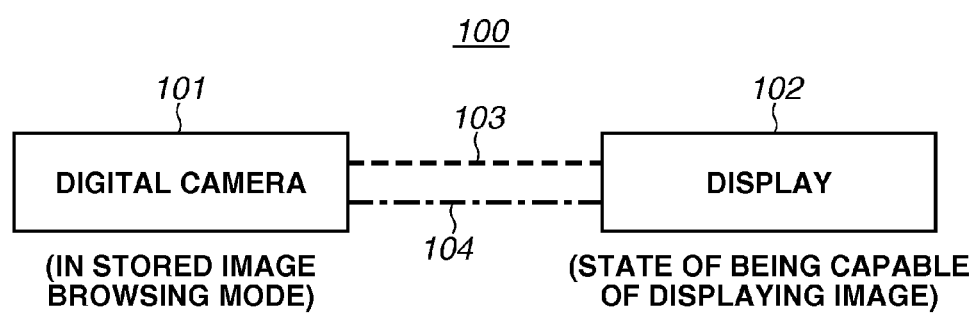
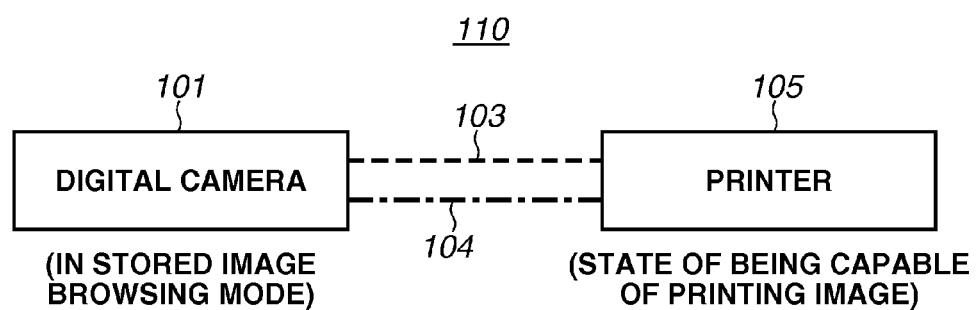

FIG.10
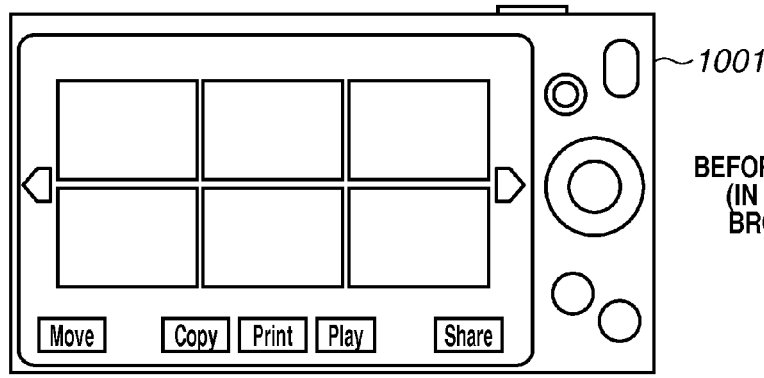
BEFORE ANY TOUCHING
(IN STORED IMAGE
BROWSING MODE)
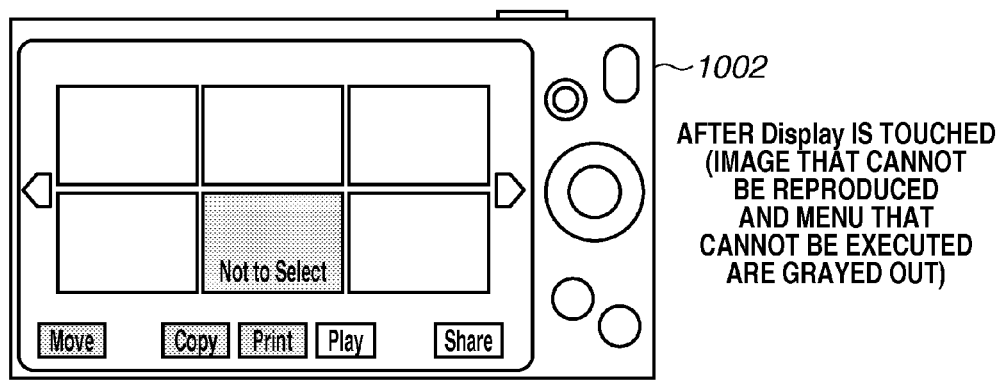
AFTER Display IS TOUCHED
(IMAGE THAT CANNOT
BE REPRODUCED
AND MENU THAT
CANNOT BE EXECUTED
ARE GRAYED OUT)
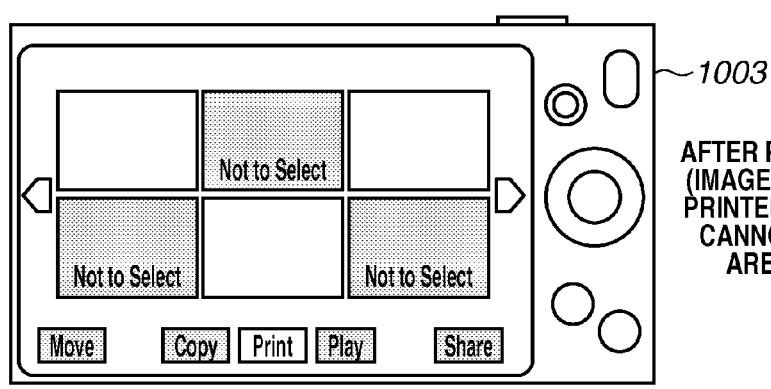
AFTER Printer IS TOUCHED
(IMAGE THAT CANNOT BE
PRINTED AND MENU THAT
CANNOT BE EXECUTED
ARE GRAYED OUT)

COMMUNICATION DEVICE, CONTROLLING METHOD FOR COMMUNICATION DEVICE, AND STORAGE MEDIUM

BACKGROUND

1. Field

Aspects of the present invention generally relate to a communication technique.

2. Description of the Related Art

In recent years, employment of short range wireless communications such as Near Field Communication (NFC), Infrared Data Association (IrDA), and TransferJet® has started in mobile phones. With the short range wireless communications, the user only has to bring a user device close to another device to implement device-to-device data exchange. Further, a technique has been available with which handover can be performed from the short range wireless communications to another wireless communication scheme such as a wireless local area network (LAN) (IEEE802.11 standards) or Bluetooth®.

In this context, the following technique discussed in Japanese Patent Application Laid-Open No. 2009-207069 has been available. More specifically, not only a communication parameter for performing communications in the wireless communication scheme performing the handover, but also capability information related to an application executable by the user device is transmitted through the short range wireless communications. Then, whether the handover is executable is determined based on the transmitted information.

In view of the above, there is a room for improvement in the conventional technique regarding the following matter. More specifically, improvement can be made on a technique of appropriately selecting a service to be executed through communications after the handover in accordance with a state of the user device when communications for executing the handover start. Japanese Patent Application Laid-Open No. 2009-207069 includes no description on a system in which one device notifies, with the information transmitted through the NFC, a communication partner device of the state of the device when the communications for executing the handover start.

SUMMARY

An exemplary embodiment is directed to a device that notifies a communication partner device of the state of the own device.

According to an aspect of the present disclosure, a communication device includes a first communication unit configured to perform a wireless communication with another communication device through a first communication scheme, a second communication unit configured to perform a wireless communication with the another communication device through a second communication scheme having a higher communication speed than the first communication scheme, a transmission unit configured to transmit, with the first communication unit, a first request message for requesting connection by the second communication scheme to the another communication device, which includes information indicating that the communication processing to be requested to the another communication device is not determined, in a case where the first communication unit establishes connection with the another communication device without determining communication processing to be requested to the another communication device, a reception unit configured to receive, after the transmission unit transmits the first request message, a first response message including information indicating whether connection is able to be established by the second communication unit and information indicating communication processing that is executable by the another communication device using the wireless communication through the second communication scheme, and a selection unit configured to select communication processing to be executed using the wireless communication through the second communication scheme based on the information included in the first response message received by the reception unit and information about the communication processing executable by the another communication device using the wireless communication through the second communication scheme.

Further features of the present disclosure will become apparent from the following description of exemplary embodiments with reference to the attached drawings.

BRIEF DESCRIPTION OF THE DRAWINGS

FIG. 1 is a diagram illustrating system configurations according to an exemplary embodiment.

FIG. 10 is a diagram illustrating an example of how a display content on a user interface (UI) of the digital camera changes.

DESCRIPTION OF THE EMBODIMENTS

Figure 2:
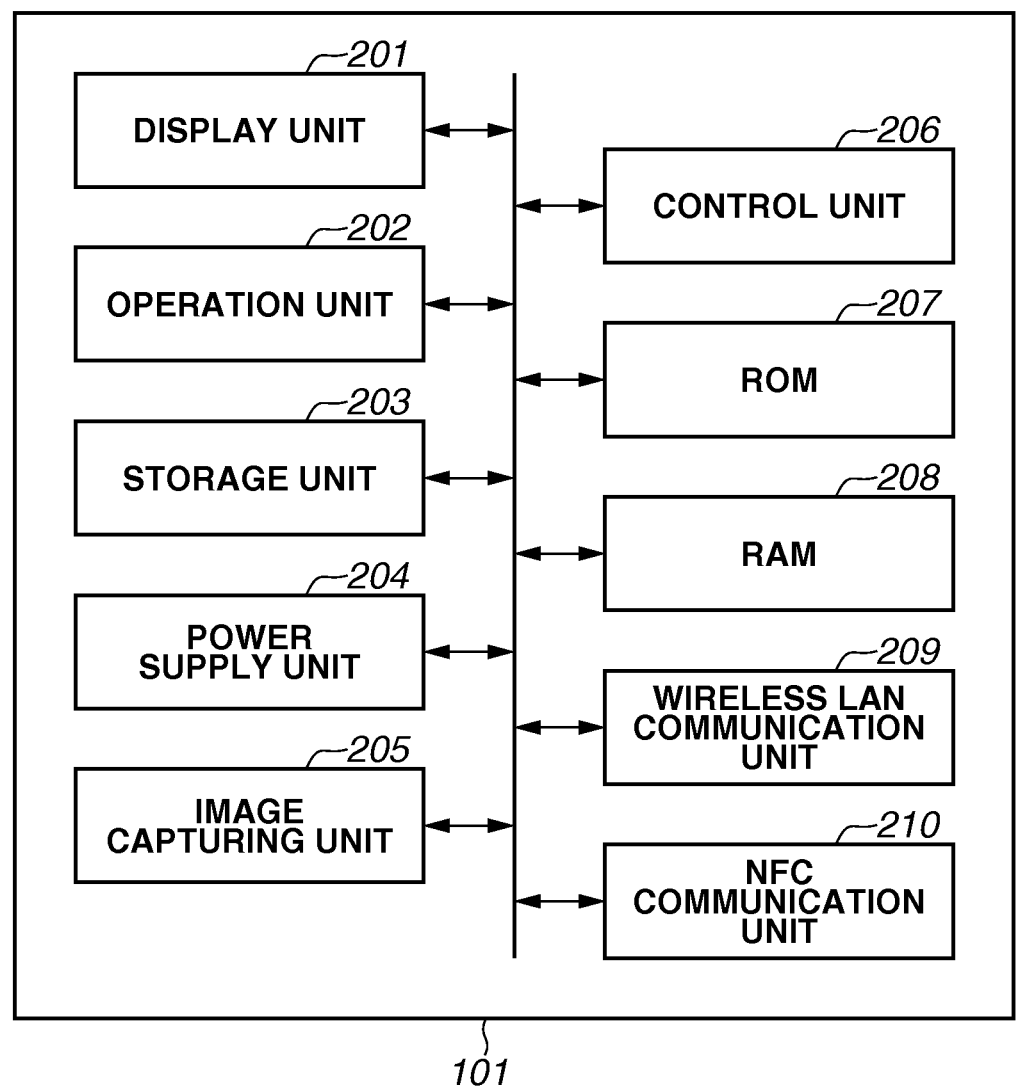
FIG. 2 is a diagram illustrating an example of a hardware configuration of a digital camera.

A communication device and a communication system according to an exemplary embodiment are described in detail below with reference to the drawings.

FIG. 1 is a diagram illustrating system configurations 100 and 110 according to the present exemplary embodiment including a digital camera 101 as a communication device, a display 102, and a printer 105. The digital camera 101 and the display 102 can communicate with each other through an NFC communication 103 or a wireless LAN communication 104. The digital camera 101 and the printer 105 can also communicate with each other through the NFC communication 103 or the wireless LAN communication 104.

Next, a hardware configuration of the digital camera 101 will be described with reference to FIG. 2. The digital camera 101 includes a display unit 201, an operation unit 202, a storage unit 203, a power supply unit 204, an image capturing unit 205, a control unit 206, a read only memory (ROM) 207, a random access memory (RAM) 208, a wireless LAN communication unit 209, and an NFC communication unit 210.

The display unit 201, which is formed of a liquid crystal display (LCD) and light emitting diodes (LEDs) for example, has a function of outputting visually recognizable information, and displays a user interface (UI) related to an application. The operation unit 202, with which a user performs various input, has a function of operating the digital camera 101. The storage unit 203, which is formed of a storage medium such as a hard disk drive (HDD), a flash memory, or a removable secure digital (SD) card for example, stores and manages various types of data such as wireless communication network information, data transmission/reception information, and image data. The power supply unit 204, which is a battery for example, includes a power supply for operating the entire device, and supplies power to each hardware unit.

The image capturing unit 205, including an imaging sensor, a lens, and the like, captures a photograph or a video. The control unit 206, which is a central processing unit (CPU) for example, controls operation of the entire digital camera 101. The ROM 207 stores a control command, that is, a program. The operations described below are implemented by the control unit 206 executing the control program stored in the ROM 207. The RAM 208 is used as a work memory for executing the program or for temporary storage of data.

The wireless LAN communication unit 209 performs the wireless LAN communication 104. The wireless LAN communication unit 209 performs wireless communication conforming to IEEE802.11 standards. While the wireless communication performed by the wireless LAN communication unit 209 conforms to the IEEE802.11 standards in the present exemplary embodiment, another communication scheme such as Bluetooth® may also be used.

The NFC communication unit 210 performs the NFC communication 103. The NFC communication unit 210 performs wireless communication conforming to an NFC standard defined by the NFC Forum. Upon detecting a communicable device within a communication range, the NFC communication unit 210 automatically establishes the NFC communication 103. The NFC communication unit 210 performs wireless communication conforming to the NFC standard in the description above. However, the NFC communication unit 210 may employ a communication scheme allowing communication only at a shorter distance than a communication scheme employed by the wireless LAN communication unit 209. The NFC communication unit 210 may employ a communication scheme of a lower communication speed and with lower power consumption compared with that employed by the wireless LAN communication unit 209. For example, the NFC communication unit 210 may employ a Bluetooth® Low Energy (BLE) system defined by Bluetooth® 4.0.

Figure 3:
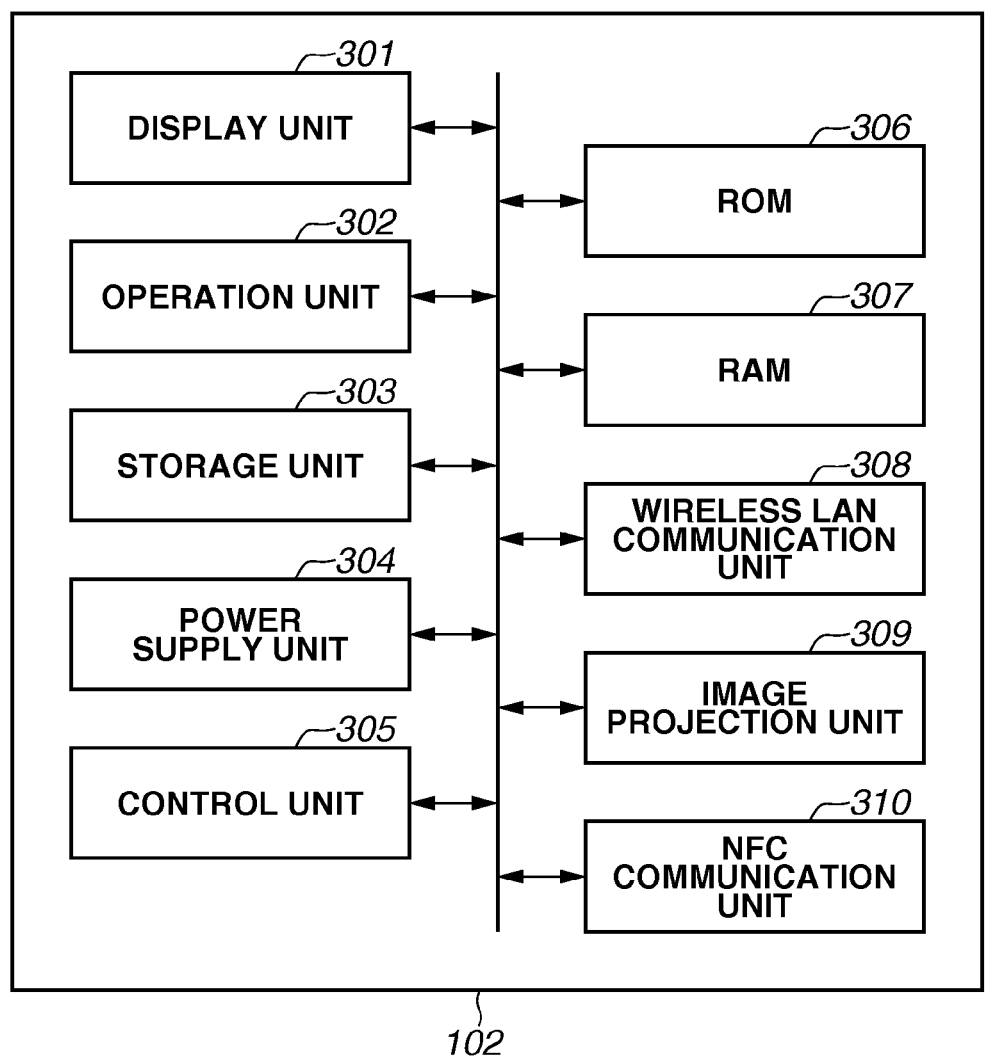
FIG. 3 is a diagram illustrating an example of a hardware configuration of a display.

Next, a hardware configuration of the display 102 will be described with reference to FIG. 3.

The display 102 includes a display unit 301, an operation unit 302, a storage unit 303, a power supply unit 304, a control unit 305, a ROM 306, a RAM 307, a wireless LAN communication unit 308, an image projection unit 309, and an NFC communication unit 310.

The storage unit 303, which is formed of a storage medium such as an HDD, a flash memory, or a removable SD card for example, stores and manages various types of data such as wireless communication network information, data transmission/reception information, and image data. The power supply unit 304 includes power supply for operating the entire device, and supplies power to each hardware unit.

The control unit 305, which is a CPU for example, controls an operation of the entire display 102. The ROM 306 stores a control command, that is, a program. The operations described below are implemented by the control unit 305 executing the control program stored in the ROM 306. The RAM 307 is used as a work memory for executing the program or for temporary storage of data.

The wireless LAN communication unit 308 performs the wireless LAN communication 104. The wireless LAN communication unit 308 performs wireless communication conforming to IEEE802.11 standards. The wireless communication performed by the wireless LAN communication unit 308 conforms to the IEEE802.11 standards in the present exemplary embodiment, however, another communication scheme such as Bluetooth® may be used. The image projection unit 309, which is formed of a liquid crystal panel, visualizes decoded electronic image data.

The NFC communication unit 310 performs the NFC communication 103. The NFC communication unit 310 performs wireless communication conforming to an NFC standard. Upon detecting a communicable device within a communication range, the NFC communication unit 310 automatically establishes the NFC communication 103. The NFC communication unit 310 performs wireless communication conforming to the NFC standard in the description above. However, the NFC communication unit 310 may employ a communication scheme communicable only at a shorter communication distance than that in a communication scheme employed by the wireless LAN communication unit 308. The NFC communication unit 310 may employ a communication scheme of a lower communication speed and with lower power consumption compared with that employed by the wireless LAN communication unit 308. The NFC communication unit 310 may employ the BLE system for example.

Figure 4:
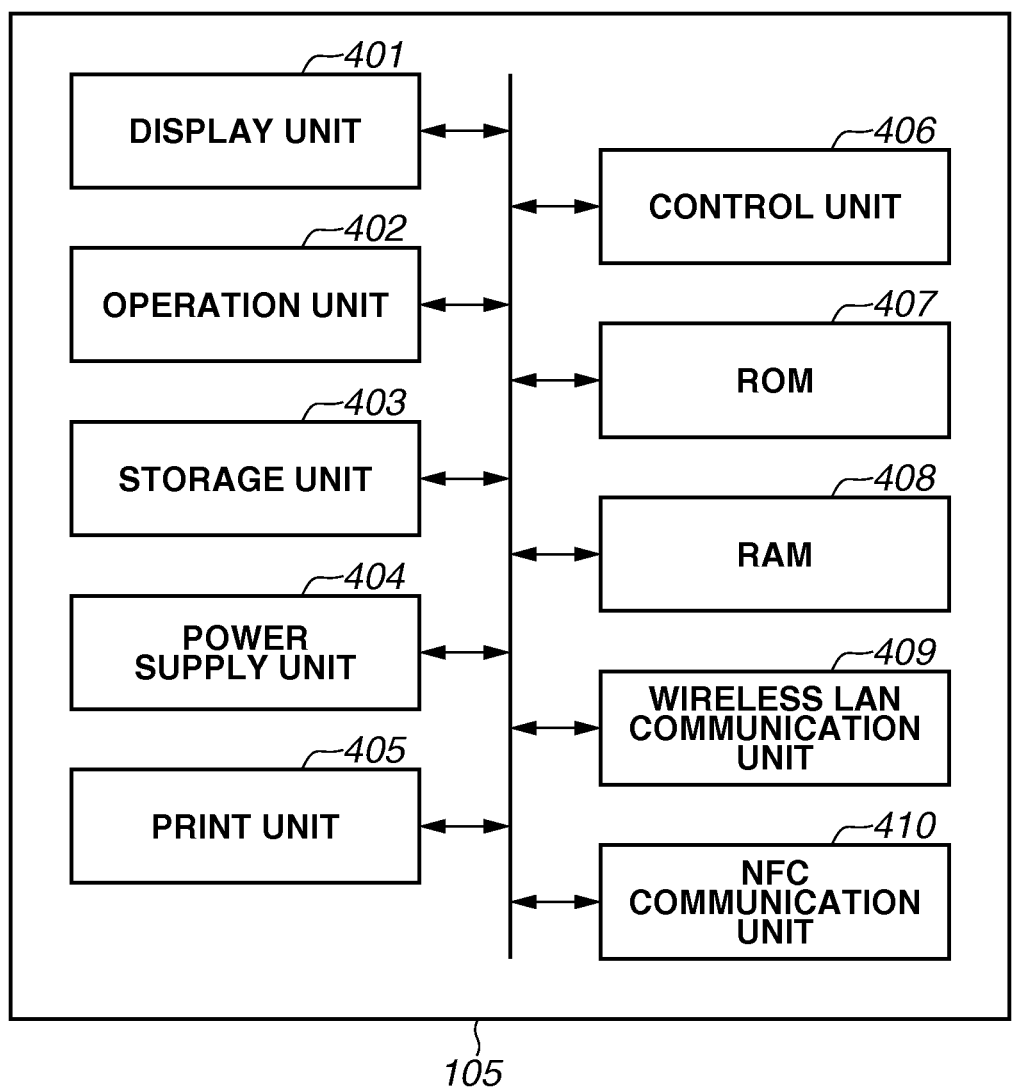
FIG. 4 is a diagram illustrating an example of a hardware configuration of a printer.

Next, a hardware configuration of the printer 105 is described with reference to FIG. 4.

The printer 105 includes a display unit 401, an operation unit 402, a storage unit 403, a power supply unit 404, a print unit 405, a control unit 406, a ROM 407, a RAM 408, a wireless LAN communication unit 409, and an NFC communication unit 410.

The storage unit 403, which is formed of a storage medium such as an HDD, a flash memory, or a removable SD card for example, stores and manages various types of data such as wireless communication network information, data transmission/reception information, and image data. The power supply unit 404 includes power supply for operating the entire device, and supplies power to each hardware unit. The print unit 405 includes a print driving system, a print engine, and the like, and prints the decoded electronic image data.

The control unit 406, which is a CPU for example, controls an operation of the entire printer 105. The ROM 407 stores a control command, that is, a program. The operations described below are implemented by the control unit 406 executing the control program stored in the ROM 407. The RAM 408 is used as a work memory for executing the program or for temporary storage of data. The wireless LAN communication unit 409 performs the wireless LAN communication 104. The wireless LAN communication unit 409 performs wireless communication conforming to IEEE802.11 standards.

while the wireless communication performed by the wireless LAN communication unit 409 conforms to the IEEE802.11 standards in the present exemplary embodiment, another communication scheme such as Bluetooth® may be used.

The NFC communication unit 410 performs the NFC communication 103. The NFC communication unit 410 performs wireless communication conforming to the NFC standard. Upon detecting a communicable device within a communication range, the NFC communication unit 410 automatically establishes the NFC communication 103. The NFC communication unit 410 performs wireless communication conforming to the NFC standard in the description above. However, the NFC communication unit 410 may employ a communication scheme communicable at a shorter communication distance than a communication scheme employed by the wireless LAN communication unit 409. The NFC communication unit 410 may employ a communication scheme of a lower communication speed and with lower power consumption compared with that employed by the wireless LAN communication unit 409. The NFC communication unit 410 may employ the BLE system for example.

Next, a functional block of the digital camera 101, the display 102, and the printer 105 will be described with reference to FIG. 5.

Figure 5:
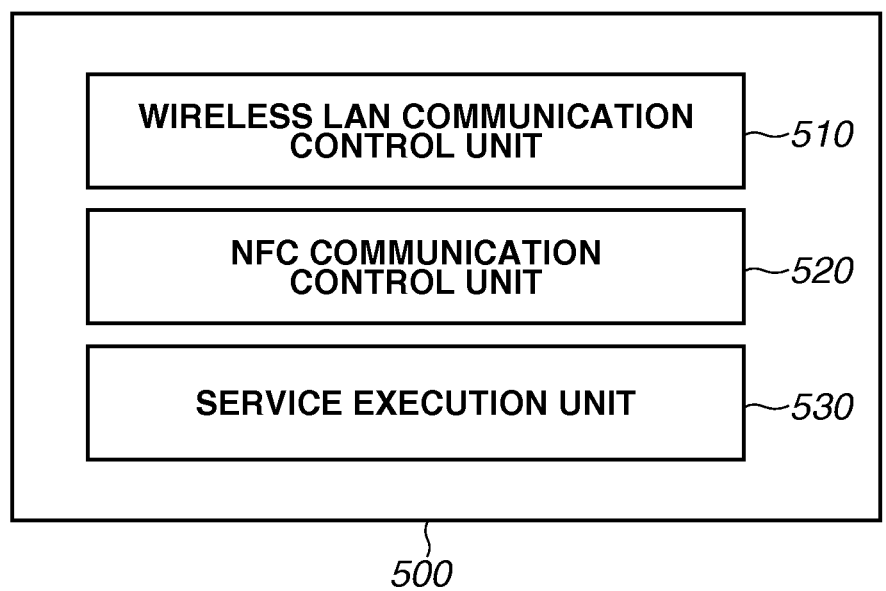
FIG. 5 is a diagram illustrating an example of a software functional block configuration of each device.

In the present exemplary embodiment, the functional block illustrated in FIG. 5 is stored as a program in the ROMs 207, 306, and 406 of the respective devices. A function of the program is implemented when the program is executed by the control units 206, 305, and 406, respectively.

The control units 206, 305, and 406 implement each function by controlling each hardware unit, and by calculating and processing information. All or part of the units in the functional block may be implemented as a hardware unit.

In this case, all or part of the units is formed by an application specific integrated circuit (ASIC) for example.

FIG. 5 is a diagram illustrating the functional block 500 of the digital camera 101, the display 102, and the printer 105. Each device includes a wireless LAN communication control unit 510, an NFC communication control unit 520, and a service execution unit 530.

The wireless LAN communication control unit 510 is a processing unit that controls the wireless LAN communications through the wireless LAN communication unit 209, 308, or 409. The wireless LAN communication control unit 510 has a station function of operating as a wireless LAN terminal and an access point (AP) function of operating as an access point.

The NFC communication control unit 520 is a processing unit that controls the NFC communication 103 through the NFC communication unit 210, 310, or 410. The wireless LAN communication control unit 510 and the NFC communication control unit 520 can execute handover processing based on Wi-Fi Direct defined by Wi-Fi Alliance. Wi-Fi Direct defines a wireless communication which forms a communication group among devices serving as a communication partner that is determined through an NFC communication to perform the wireless LAN communication.

In Wi-Fi Direct, a communication device that performs a wireless LAN access point function is referred to as a P2P group owner (hereinafter, referred to as GO), and a communication device that performs a wireless LAN station function is referred to as a P2P client (hereinafter, referred to as CL).

These roles are determined by a GO Negotiation protocol and are defined in the Wi-Fi Direct specification. In Wi-Fi Direct, the network established by the GO is referred to as a P2P group. In this specification, the network is also described as the P2P group, and thus the network and the P2P group have the same meaning.

In this specification, the P2P GO, the P2P CL, and a group of communication device of which the role has not been determined are collectively referred to as a P2P device. The P2P device can both join (CL function) and establish (GO function) the wireless network. Whether a P2P device operates as the GO or the CL is automatically determined by executing a Wi-Fi Direct protocol. Thus, the P2P device can operate playing any determined role to establish the wireless connection and perform wireless communications.

A connection is established between devices, based on Wi-Fi Direct by using communication parameters provided from the GO to the CL. The communication parameters include various wireless communication parameters for performing wireless communications based on the IEEE802.11 standards, such as a service set identifier (SSID) as a network identifier, an encryption scheme, an encryption key, an authentication scheme, and an authentication key. The communication parameters may further include a media access control (MAC) address and an internet protocol (IP) address for performing communications in an IP layer.

The service execution unit 530 is a processing unit that manages information on an external device service that can be executed by the digital camera 101, the display 102, or the printer 105 by using the communication unit 209, 308, or 409, and executes the service.

The service information managed by the service execution unit 530 includes a service identifier, an execution procedure of the service corresponding to the identifier, and option information on the service. The service execution unit 530 executes communication processing (service) through the wireless LAN communication 104. The digital camera 101, the display 102, and the printer 105 according to the present exemplary embodiment can execute a data transfer service, a data reproduction service, a printing service, and the like. Executable protocols used in a data transfer service include, "digital living alliance network (DLNA) Upload/Download", "DLNA 2Box Pull/Push", "FTP", and "Internet Printing Protocol (IPP)".

FIG. 10 illustrates an example of how a display content on the UI of the digital camera 101 changes in an image browsing mode. An example 1001 illustrates a UI display content while in the stored image browsing mode before a start of the NFC communication 103. An example 1002 illustrates a UI display content while in the stored image browsing mode updated through the NFC communication 103 with the display 102. An example 1003 illustrates the UI display content while in the stored image browsing mode after carrying out the NFC communication 103 with the printer 105.

In the example 1002, a selection button for a file that cannot be displayed on the display 102, and selection buttons for "Move", "Copy", and "Print", as services that cannot be executed, are grayed out. In the example 1003, selection buttons for files that cannot be printed by the printer 102, and selection buttons for "Move", "Copy", "Play", and "Share", as services that cannot be executed, are grayed out.

The devices in the communication systems 100 and 101 according to the present exemplary embodiment are described to take an example of connection between the digital camera, the display, and the printer. Alternatively, the devices may be a smartphone, a personal computer, a video camera, a smartwatch, a personal digital assistant (PDA), or the like.

Operations in the communication system having the configuration described above are described below.

A case where handover from the NFC communication 103 to the wireless LAN communication 104 is executed between the digital camera 101 and the display 102, and communication processing is executed through the wireless LAN communication 104, is described below, with reference to flowcharts in FIGS. 8 and 9, and a sequence chart in FIG. 6.

Figure 6:
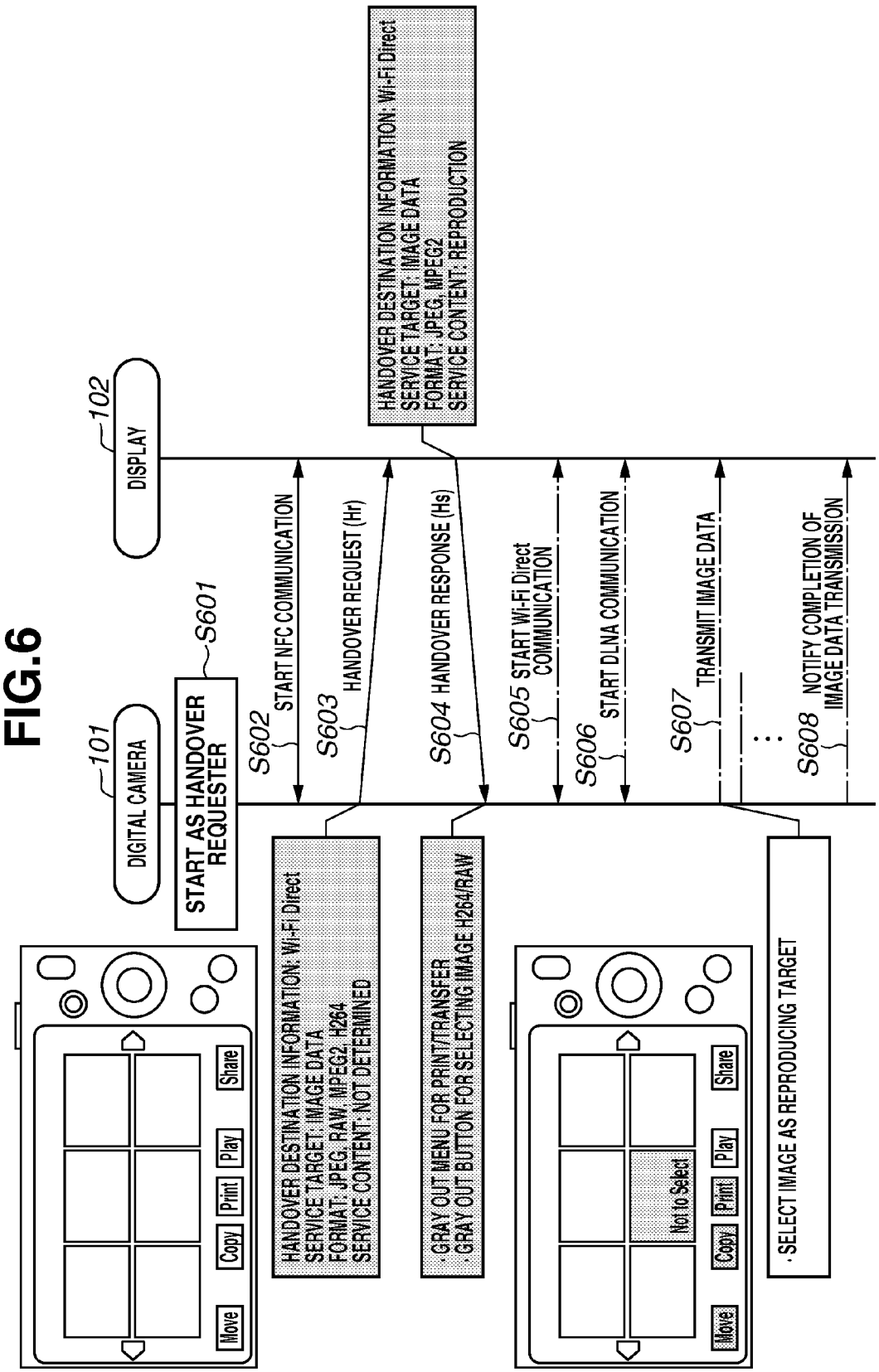
FIG. 6 is a system sequence chart according to the exemplary embodiment.

FIG. 6 is a sequence chart illustrating the following procedure. More specifically, the digital camera 101, which is operating in the browsing mode for the user to browse the stored image when a service to be executed has not been determined, establishes the NFC communication 103 with the display 102 and performs the handover to the wireless LAN communication 104. FIG. 8 is a flowchart illustrating operations performed by the digital camera 101 serving as the requester. FIG. 9 is a flowchart illustrating operations performed by the display 102 serving as the selector.

First of all, the digital camera 101 enters the stored image browsing mode in accordance with an operation input by a user through the operation unit 202.

In step S601, after entering the stored image browsing mode, the digital camera 101 controls the NFC communication unit 210 with the NFC communication control unit 520 so that the digital camera 101 operates as a requester that requests the display 102 to execute the handover and the service. When the user, who is browsing an image, attempts to perform the NFC communication 103, the browsed image is likely the service target intended by the user. Thus, the digital camera 101 operates as the requester. The digital camera 101 may operate as the requester while operating in a mode other than the image browsing mode. Alternatively, the display 102 may also operate as the requester, or the digital camera 101 may operate as the selector.

The digital camera 101 may always operate as the requester, and the display 102 may always operate as the selector. More specifically, whether the digital camera 101 operates as the requester or the selector may be fixed at all times based on a type of the device.

In steps S602, S801, and S901, when the digital camera 101 is brought into proximity to the display 102, the NFC communication 103 is established. The digital camera 101 determines whether the digital camera 101 is in the browsing mode (step S802). More specifically, the digital camera 101 determines whether the digital camera 101 is in the state of operating as the requester, and whether the NFC communication 103 has started without determining the service to be executed.

In FIG. 6, the digital camera 101 operates as the requester, and the NFC communication 103 starts without determining the service to be executed. In step S803, the digital camera 101 recognizes the format of the browsing target image. Then, in step S804, the digital camera 101 sets information about the format type of the browsing target image to a "service target," which is an information element included in the request message. In steps S603 and S805, the digital camera 101 transmits the handover request message (hereinafter, referred to as a request message) through the NFC communication unit 210. The request message is used to request for newly establishing connection through a communication scheme different from the NFC.

In the present exemplary embodiment, the request message is a handover request message defined in NFC Forum Connection Handover Technical Specification.

The request message includes "carrier information" for identifying a communication scheme (carrier) which requires handover. The carrier information includes information about a communication type such as Wi-Fi Direct, wireless LAN, Wi-Fi IBSS, and Bluetooth®. The carrier information may further include a power state (active, inactive, or the like) of each wireless carrier.

The request message includes "service content" as identifier information about a service which the digital camera 101 requests the communication partner device to execute. The service content includes information for identifying a service such as the data transfer, the data reproduction, and the printing. The request message further includes a "service target" as information relating to data on which a service is to be executed.

When the NFC communication 103 starts without determining the service to be executed, the request message according to the present exemplary embodiment includes information indicating that the "service content" has not been determined. The information indicating that the "service content" has not been determined is information for requesting the communication partner device to transmit information about an executable service and to perform the handover to the wireless LAN communication 104. Even when the "service content" has not been determined, the request message may include the "service target" as an information element.

As information indicating that the "service content" has not been determined, NULL (a value explicitly indicating the absence of the information) may be set to an information field corresponding to the service content in the request message. Alternatively, the field length of the information field corresponding to the service content may be set to 0.

The service target of the request message includes an index (for example, a uniform resource identifier (URI), a uniform resource locator (URL), an IP address, and a port number) for accessing data as the target of the service. The service target includes information about the type of data (for example, a still image [JPEG], a still image [RAW], a moving image [MPEG2], a moving image [H264], and music [MP3]) as the target of the executed service.

Figure 8:
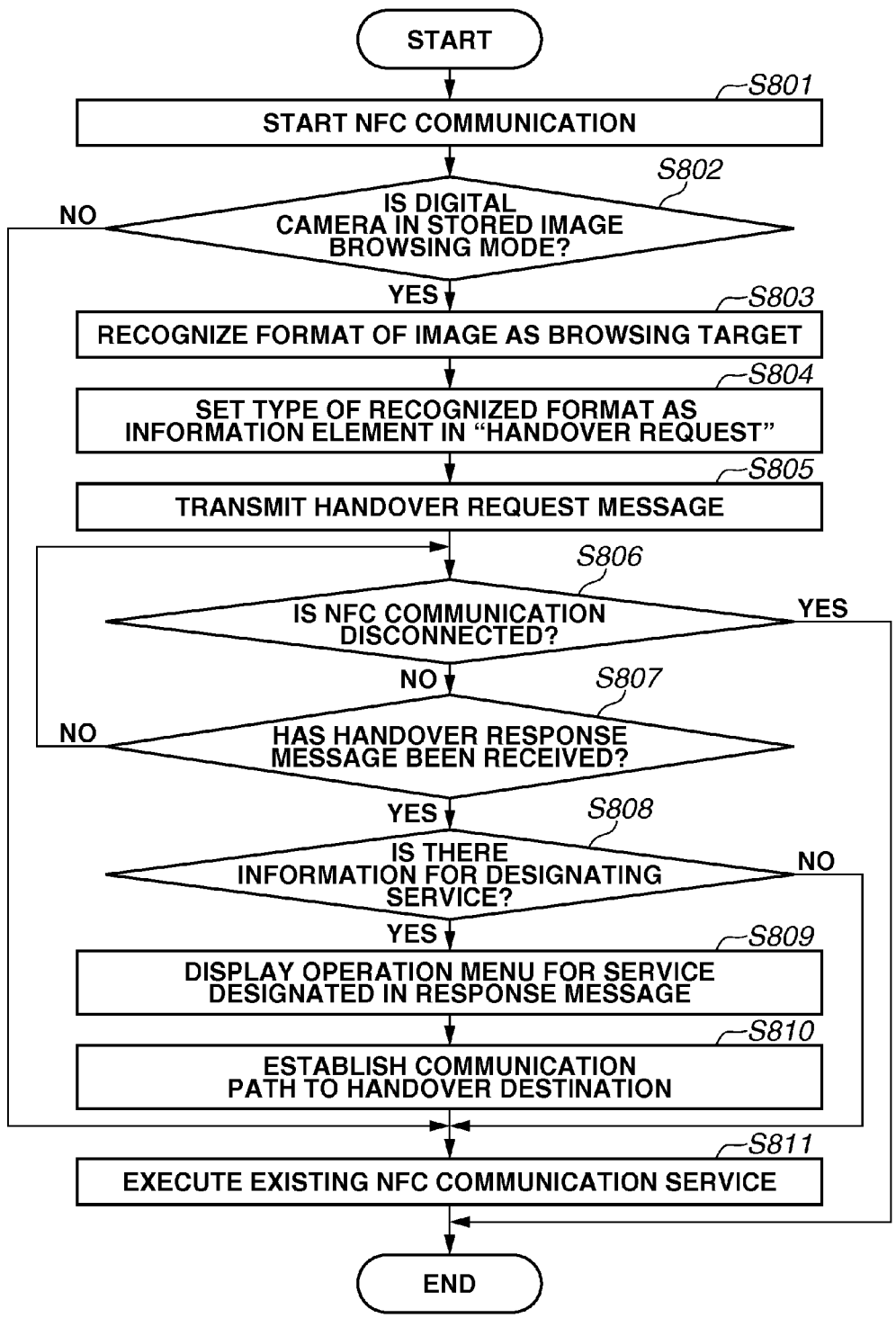
FIG. 8 is a flowchart illustrating operations of a requester.
Figure 9:
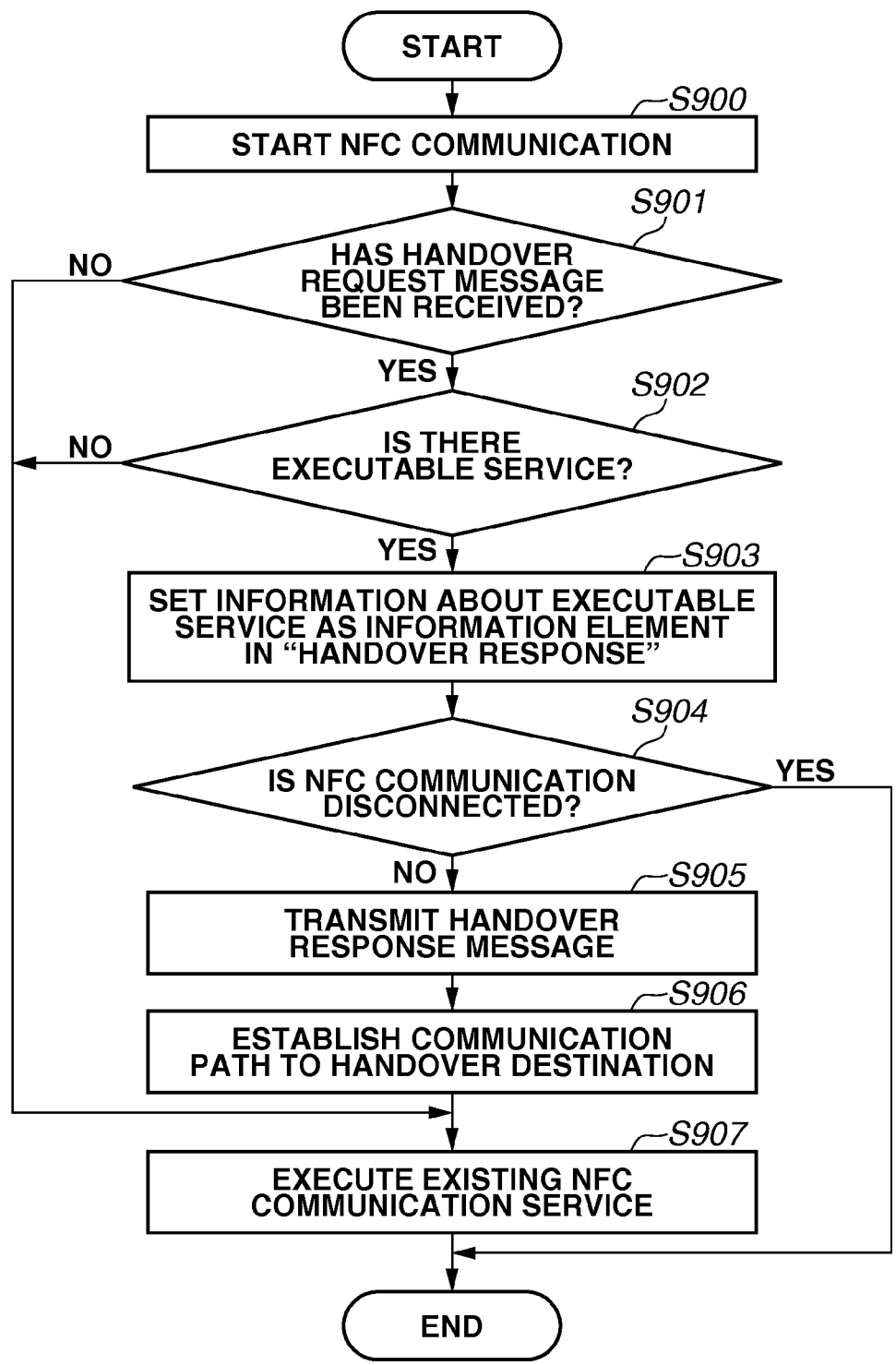
FIG. 9 is a flowchart illustrating operations of a selector.

In steps S603 and S805, as illustrated in FIGS. 6 and 8, the digital camera 101 inputs the format of the image as the browsing target to the service target, and transmits the request message including the information indicating that the service content has not been determined, to the display 102. When the NFC communication 103 starts in a state where a service for which the execution is requested is determined, the digital camera 101 transmits a request message, in which the desired service to be executed is input to the service content.

On the other hand, when the NFC communication 103 starts (step S900), the display 102 determines whether the request message has been received through the NFC communication 103 (step S901). When no request message has been received (No in step S901), the display 102 executes an existing NFC service as described later (step S907). On the other hand, when the request message has been received (Yes in step S901), the display 102 analyzes the information element in the request message received from the digital camera 101, to determine whether there is an executable service based on the result of the analysis (step S902).

In FIG. 6, the request message transmitted from the digital camera 101 includes information indicating that the service content has not been determined, and thus the display 102 can determine the service that can be executed by the display 102. Here, since the type and the format of the data are input as the service target into the request message from the digital camera 101, the service executing the type and the format of the data is determined. When the request message not including the type and the format of the data as the service target is received, the display 102 may be configured to extract all services that can be executed by itself.

The display 102 sets the "service content" executable by the display 102 and the "service target" to the information element (step S903), and transmits a handover response message including the information elements through the NFC communication 103 (steps S604 and S905).

The handover response message according to the present exemplary embodiment is a handover select message defined in the NFC Forum Connection Handover Technical Specification. When the handover to the communication scheme and the service that are requested by the communication partner device are executable, carrier information and service information respectively indicating the communication scheme and the service are input to the handover response message. When the handover to the communication scheme and the service that are requested by the communication partner device is not executable, the carrier information and the service information respectively indicating the communication scheme and the service are not input to the handover response message. The handover response message may include information indicating that the handover or the service that has been requested cannot be executed.

The display 102 transmits the response message refusing the handover when there is no executable service and the requested handover cannot be performed. Upon receiving from the digital camera 101 the request message, in which the execution of the desired service is input to the service content, the display 102 transmits the response message including information indicating whether the service can be executed.

The digital camera 101 and the display 102 terminate the processing upon detecting the disconnection of the NFC communication 103 before the response message is transmitted (step S806 and step S904).

The digital camera 101 receives the response message from display 102 (S807) and analyzes the information element in the message. Then, the digital camera 101 determines whether the received response message includes information indicating that the service executable by the display 102 is designated (step S808). Then, the digital camera 101 determines whether the "service content" and the "service target" designated by the display 102 are executable by the digital camera 101.

When the service is not executable (No in step S808), the handover processing is not performed and the existing NFC communication service is executed (step S811). When the service is executable (Yes in step S808), the digital camera 101 displays an operation menu corresponding to the service designated in the handover response message on the display unit 201 (step S809). Then, the digital camera 101 and the display 102 establish the wireless LAN communication 104 serving as the wireless communication path to the handover destination, with the wireless LAN communication units 209 and 308 based on Wi-Fi Direct (S605, S810, and S906).

An example of the handover processing for establishing the wireless LAN communication 104 will be described. The digital camera 101, when operating as the access point, inputs a communication parameter for the wireless LAN communication 104 to the handover request message or the handover response message transmitted to or from the communication partner device. The communication parameter includes wireless communication parameters required for the wireless LAN communication 104 such as an SSID as a network identifier, an encryption scheme, an encryption key, an authentication scheme, and an authentication key, and a MAC address. The communication parameters may further include an IP address for performing communications in an IP layer. Then, the digital camera 101 waits for the wireless LAN connection from the communication partner device.

The digital camera 101, when operating as the station, acquires the communication parameter for the wireless LAN communication 104. The communication parameter is included in the handover request message or the handover response message transmitted to or from the communication partner device. Then, the wireless LAN communication unit 209 searches for the communication partner device based on the acquired communication parameter through the wireless LAN communication. Then, the wireless LAN communication 103 is established with the communication partner device through authentication based on the acquired communication parameter.

When the NFC communication 103 between the digital camera 101 and the display 102 is continuously maintained after the wireless LAN communication 104 is established, the existing NFC communication service enters an execution waiting state (S811 and S907). The existing NFC communication service is communication processing that is executed only through the NFC communication and involves no communication for performing the handover.

In FIG. 6, the response message transmitted by the display 102 includes information indicating that a still image [JPEG] and a moving image [MPEG2] can be reproduced (S604). The digital camera 101 recognizes that the display 102 can reproduce the still image [JPEG] and the moving image [MPEG2], and thus changes the display content so that only these data formats can be selected. The update from the example 1001 to the example 1002 in FIG. 10 represents an example of the change in the display content. As described above, updating to the operation UI related to the executable service is automatically performed through the communication path to the handover destination. Thus, the service, which can be executed together with other devices, can be swiftly selected without any further communications after the handover.

It is assumed here that after the change to the UI on which only the data format and the service processable by the display 102 can be selected, the digital camera 101 selects the moving image [MPEG2] and the service for reproducing the moving image through the user operation.

The digital camera 101 starts a DLNA 2Box Push service through the wireless LAN communication 104 (step S606). More specifically, the digital camera 101 transmits the moving image to be reproduced to the display 102 through the wireless LAN communication 104 (step S607). Then, the display 102 performs streaming reproduction of the received moving image with the image projection unit 309.

In the present exemplary embodiment, an example is described where the wireless LAN communication 104 as the handover destination communication path is maintained after the completion of the transmission of the moving image data as the reproducing target is notified (step S608). Alternatively, the communication path to the handover destination may be released in response to the notification of the transmission completion.

Although the wireless LAN communication 104 is the only communication scheme after the handover in the description above, other communication schemes may be used in accordance with the service to be executed. For example, Bluetooth® may be used as a wireless communication medium for the handover destination for example.

As described above, when the NFC communication 103 starts without determining the service for which the execution is requested, the requester transmits information about the service executable by the communication partner device and information for requesting the handover to the wireless LAN communication 104. Thus, even when the requester has not determined the service for which the execution is requested, the handover is performed. Furthermore, the requester can acquire information about the service executable by the communication partner device before the handover is performed. Then, based on the information about the service executable by the communication partner device, the requester can swiftly select the service that can be executed together with the communication partner device without any further communications after the handover.

According to the present exemplary embodiment, the requester refers to the information elements related to the executable service in the handover response message, to recognize services that can be executed together with the communication partner device. Thus, false selection (selection of a print service, for example) can be prevented in advance.

Next, a case is described with reference to the sequence chart in FIG. 7 as follows. More specifically, the handover from the NFC communication 103 to the wireless LAN communication 104 is performed between the digital camera 101 and the printer 105, and the communication processing is executed through the wireless LAN communication 104.

Figure 7:
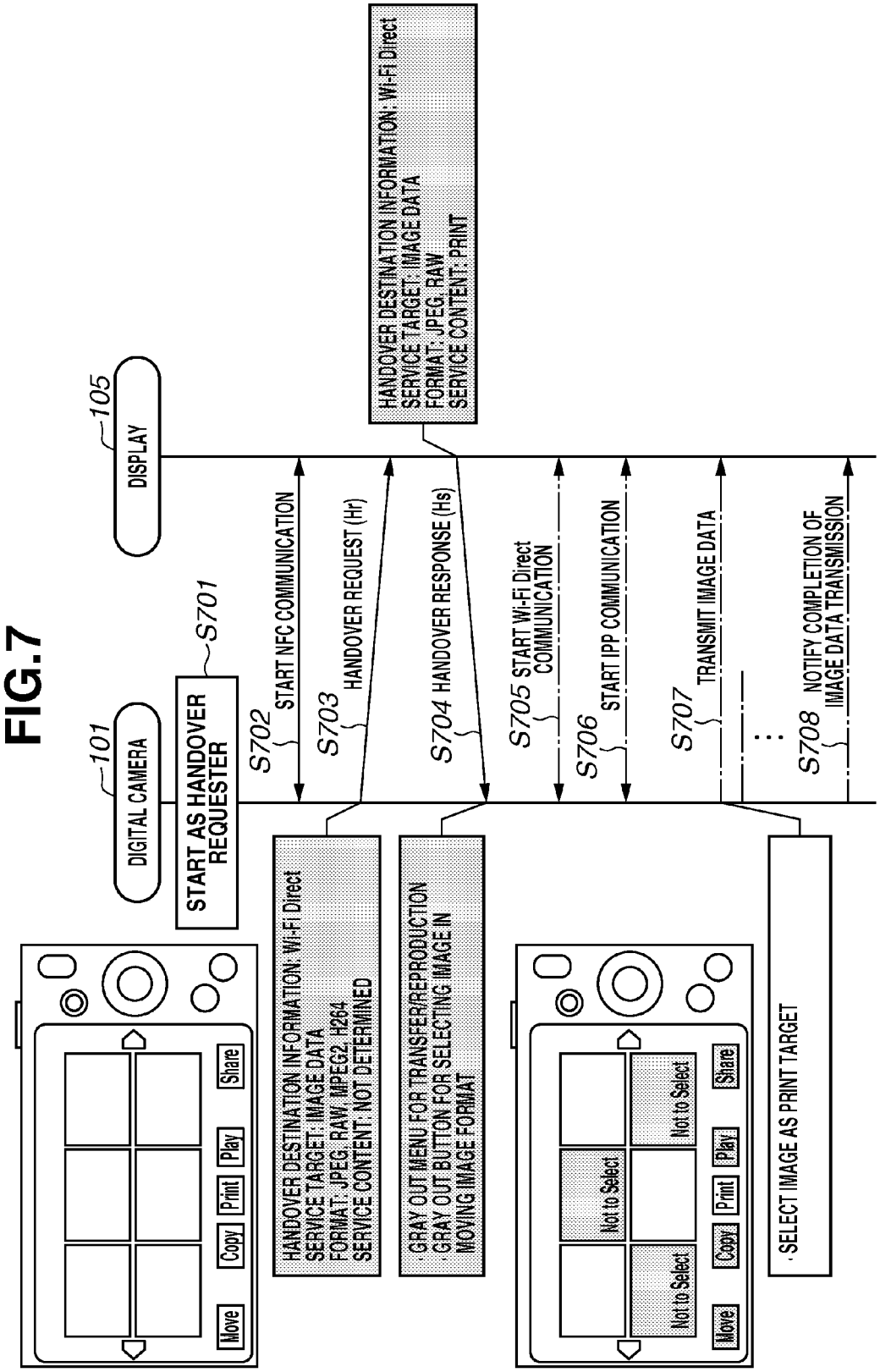
FIG. 7 is a system sequence chart according to the exemplary embodiment.

FIG. 7 is the sequence chart illustrating the following case. More specifically, the digital camera 101 that has not determined the service to be executed establishes the NFC communication 103 with the printer 105. Then, after the handover to the wireless LAN communication 104 is completed, a device cooperation service is executed in accordance with a user operation.

The digital camera 101 enters the browsing mode in which stored images are listed in response to the operation input by the user through the operation unit 202. Then, the digital camera 101 controls the NFC communication unit 210 to operate as the requester that requests the printer 105 to perform the handover and execute a service (S701).

Then, when the digital camera 101 is brought into proximity to the printer 105, the NFC communication 103 is established (step S702). The digital camera 101 operates as the requester, and the NFC communication 103 starts without determining the service to be executed. Thus, the digital camera 101 transmits the request message including the information indicating that the "service content" for which the execution is requested has not been determined (step S703). This transmitted message is the same as the one described above and thus will not be described.

The printer 105 which has received the request message from the digital camera 101 (step S703) operates as the selector. The printer 105 analyzes the information element in the request message received from the digital camera 101, and recognizes that the handover is requested without determining the service content. Then, the printer 105 recognizes a type and a storage format of data that may be a service target. Then, the printer 105 transmits the response message in which "service content" executable by the printer 105 and "service target" processable by the printer 105 are set to information elements (step S704).

Then, the digital camera 101 and the printer 105 start to establish the wireless LAN communication 104 as the wireless communication path to the handover destination (step S705).

Upon receiving the handover response message from the printer 105, the digital camera 101 analyzes the information element in the message, and determines whether the digital camera 101 can execute the "service content" and the "service target" indicated by the printer 105.

The digital camera 101 recognizes that the printer 105 is capable of printing a still image [JPEG] and an electronic document [PDF], and thus changes the display content on the UI so that only data in these formats can be selected.

After the wireless LAN communication 104 is established between the digital camera 101 and the printer 105, a service is executed in accordance with a user operation on the UI with the display content in the example 1003 related to the service executable by the digital camera 101. In the present exemplary embodiment, the still image [JPEG] stored in the digital camera 101 is selected, and a service of printing the image is selected. Then, with the wireless LAN communication 104, a 2Box Print service using an Internet Printing Protocol (IPP) starts (S706), and the still image data as the printing target is transmitted to the printer 105 (S707) to print the image. The printer 105 prints the received still image data with the print unit 405.

In the present exemplary embodiment, an example is described where connection of the wireless LAN communication 104 serving as the handover destination communication path is maintained after the completion of the transmission of the moving image data as the printing target has been notified (step S708). Alternatively, the communication path to the handover destination may be released in response to the notification of the transmission completion Although only the wireless LAN communication 104 is the communication scheme after the handover in the description above, other communication schemes may be used in accordance with the service to be executed.

According to the present exemplary embodiment, one device can notify a communication partner device of the state of its own device when communication for performing handover starts.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-149933, filed Jul. 23, 2014, which is hereby incorporated by reference herein in its entirety.

What is claimed is:

1. A communication device comprising:
a first communication unit configured to perform a wireless communication with another communication device through a first communication scheme;
a second communication unit configured to perform a wireless communication with the another communication device through a second communication scheme having a higher communication speed than the first communication scheme;
a transmission unit configured to transmit with the first communication unit a first request message for requesting connection by the second communication scheme to the another communication device, which includes information indicating that a communication processing to be requested to the another communication device is not determined, in a case where the first communication unit establishes connection with the another communication device without determining communication processing to be requested to the another communication device;
a reception unit configured to receive, after the transmission unit transmits the first request message, a first response message including information indicating whether connection can be established by the second communication unit and information indicating communication processing executable by the another communication device using the wireless communication through the second communication scheme; and
a selection unit configured to select communication processing to be executed using the wireless communication through the second communication scheme based on the information included in the first response message received by the reception unit and information about the communication processing executable by the another communication device using the wireless communication through the second communication scheme.

2. The communication device according to claim 1, wherein the transmission unit is configured to transmit with the first communication unit, in a case where the first communication unit establishes the connection with the another communication device after the communication processing to be requested to the another communication device is determined, a second request message requesting connection with the another communication device established by the second communication unit and execution of the communication processing, and
wherein the reception unit is configured to receive, in a case where the second request message is transmitted, a second response message that includes information indicating whether the communication processing requested in the second request message is executable.

3. The communication device according to claim 1, wherein in a case where transmitting the first request message, the transmission unit is further configured to include information related to a format of data as a processing target in the first request message.

4. The communication device according to claim 1, wherein, in a case where the reception unit receives the first response message, the selection unit is configured to select communication processing corresponding to the information indicating the communication processing executable by the another communication device using the wireless communication through the second communication scheme.

5. The communication device according to claim 1, further comprising a connection unit configured to, in a case where the first response message includes information indicating that connection can be established by the second communication unit, establish connection using the second communication unit.

6. The communication device according to claim 1, wherein the first communication unit is configured to perform the wireless communication through near field communication.

7. The communication device according to claim 1, wherein the second communication unit is configured to perform the wireless communication conforming to IEEE802.11.

8. The communication device according to claim 1, wherein the first request message is a handover request message defined by Near Field Communication Forum.

9. The communication device according to claim 1, wherein the first response message is a handover select message defined by Near Field Communication Forum.

10. The communication device according to claim 1,
wherein at least one of the first request message or the first response message includes a communication parameter, and
wherein the second communication unit is configured to establish connection with the another communication device based on the communication parameter.

11. The communication device according to claim 10, wherein the communication parameter includes at least one of a service set identifier, an encryption key, an encryption scheme, an authentication key, an authentication scheme, or a media access control address.

12. The communication device according to claim 1, wherein the communication processing is any one of a data transfer service, a data reproduction service, or a printing service.

13. A control method for a communication device including a first communication unit that performs a wireless communication with another communication device through a first communication scheme and a second communication unit that performs a wireless communication with the another communication device through a second communication scheme having higher communication speed than the first communication scheme, the control method comprising:
transmitting, with the first communication unit, a first request message for requesting connection by the second communication scheme to the another communication device, which includes information indicating that the communication processing requested to the another communication device has not been determined in a case where the first communication unit establishes connection with the another communication device without determining communication processing to be requested to the another communication device;
receiving, after the first request message is transmitted, a first response message including information indicating whether the connection can be established by the second communication unit and information indicating communication processing executable by the another communication device using the wireless communication through the second communication scheme; and selecting communication processing to be executed using the wireless communication through the second communication scheme based on the information, which is included in the received first response message, and the information about the communication processing executable by the another communication device using the wireless communication through the second communication scheme.

14. A non-transitory computer-readable storage medium storing computer executable instructions that cause a communication device including a first communication unit that performs a wireless communication with another communication device through a first communication scheme and a second communication unit that performs a wireless communication with the another communication device through a second communication scheme having higher communication speed than the first communication scheme to execute a control method, the control method comprising:

transmitting, with the first communication unit, a first request message for requesting connection by the second communication scheme to the another communication device, which includes information indicating that the communication processing requested to the another communication device has not been determined in a case where the first communication unit establishes connection with the another communication device without determining communication processing to be requested to the another communication device;

receiving, after the first request message is transmitted, a first response message including information indicating whether the connection can be established by the second communication unit and information indicating communication processing executable by the another communication device using the wireless communication through the second communication scheme; and selecting communication processing to be executed using the wireless communication through the second communication scheme based on the information, which is included in the received first response message, and the information about the communication processing executable by the another communication device using the wireless communication through the second communication scheme.

* * * * *